Jan. 2, 1968
S. SOLOW
3,361,968
DUAL ELECTRICAL METER
Filed June 22, 1962
2 Sheets-Sheet 1
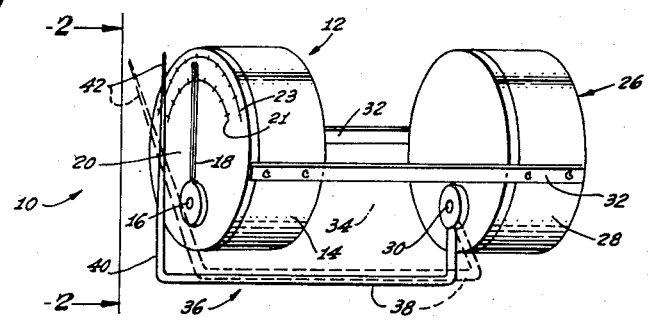
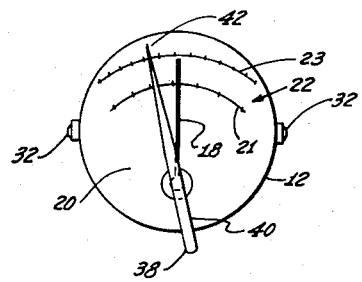
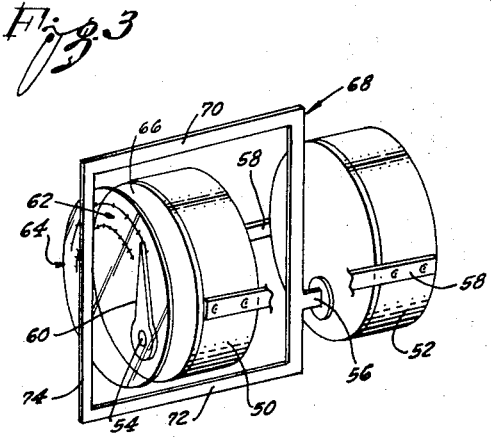
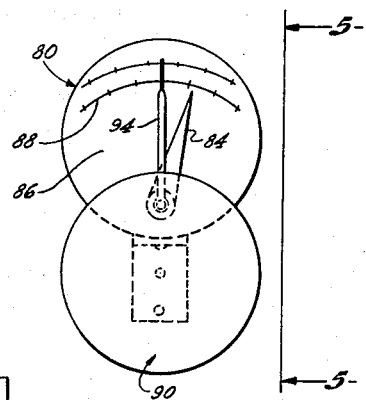
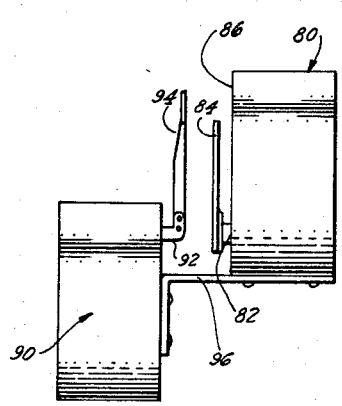
INVENTOR:
Samuel Solow
By Smyth, Roston & Pavitt
Attorneys Jan. 2, 1968 S. SOLOW 3,361,968
DUAL ELECTRICAL METER
Filed June 22, 1962 2 Sheets-Sheet 2
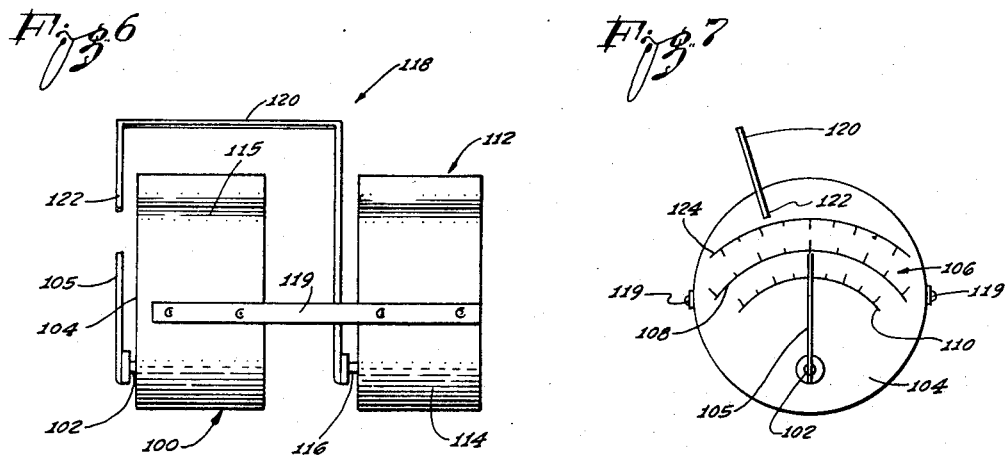
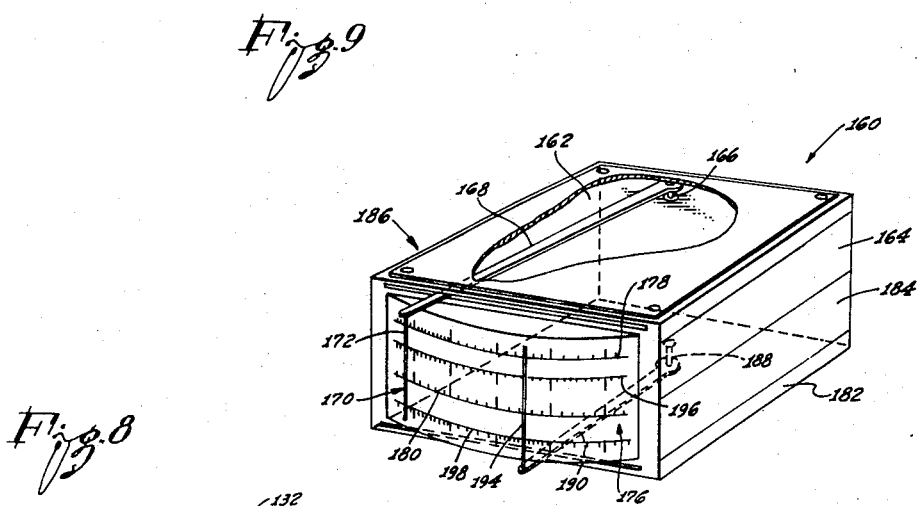
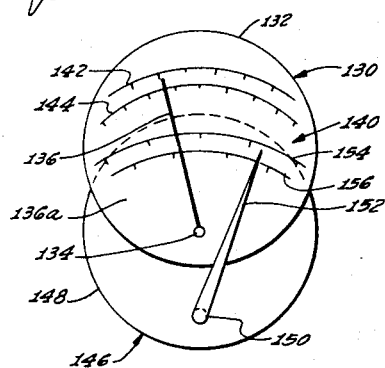
INVENTOR:
Samuel Solow
Attorneys

ABSTRACT 3,361,968
DUAL ELECTRICAL METER
Samuel Solow, 5451 Eau Claire Drive,
Rolling Hills, Calif. 90274
Filed June 22, 1962, Ser. No. 204,334
1 Claim. (Cl. 324—114)

The present invention relates to indicating means and more particularly, to means for simultaneously indicating the values of a plurality of signals.

One means of indicating the value of an electrical signal is to employ a meter having a movement therein that is responsive to the signal to be measured. The movement, in turn, is effective to cause an indicator such as a pointer to move across a scale having an array of indicia disposed thereon. As the indicator moves across the scale, it registers with various ones of the indicia and thereby indicates the value of the signal. Heretofore, when there have been a plurality of signals, it has been necessary to provide a single meter with means for switching the meter between the signal sources or a plurality of separate meters. As a result, when there were a large number of signals to be monitored, it has been customary to employ a corresponding number of meters. This not only requires a very large instrument panel for supporting the meters, but also makes it difficult for an operator to comprehend the values of the various signals. More particularly, when there have been two signals to be monitored, it has been necessary for an operator to first determine the values indicated by one meter and then to determine the values indicated by a second meter and then mentally compare the values of the two readings. The foregoing process is not only time-consuming, but also, due to the human element, is frequently inaccurate, particularly when the operator is busy or has his attention divided among several operations. In addition, it has been possible for the value of the first reading to change before the second reading has been made without the operator being aware of the intervening change, and in the event both values are changing, the operator has not been able to observe and compare the values throughout the change.

It is now proposed to provide metering means which will overcome the foregoing difficulties. More particularly, it is proposed to provide meter means which will permit an operator to quickly and simultaneously compare the values of a plurality of signals with only one observation. This is to be accomplished by providing meter means wherein a plurality of indicators are positioned to register with one or more arrays of indicia on common scale means. This will reduce the size of an instrument panel required to support the meters necessary to indicate the values of a plurality of signals. In addition, since all of the indicators will simultaneously be in the operator's field of vision, a variation in the position of any indicator will be readily apparent even though the operator is observing another indicator. Thus, it will be possible for the operator to obtain a set of readings that are accurately correlated with each other. This, in turn, will result in more accurate observations in shorter intervals of time. In addition, in the event one or more of the values is varying, the operator can direct his attention to all of the indicators and can thereby compare the values of the signals even during the changing transition.

These and other features and advantages of the present invention will become readily apparent from the following detailed description, particularly when taken in connection with the accompanying drawings wherein like reference numerals refer to like parts and, wherein:

FIGURE 1 is a view of meter means embodying one form of the present invention;

FIGURE 2 is an end view of the embodiment of FIGURE 1;

FIGURE 3 is a perspective view of meter means embodying another form of the present invention;

FIGURE 4 is a front view of meter means embodying another form of the present invention;

FIGURE 5 is a side view of the meter means of FIGURE 4;

FIGURE 6 is a side view of meter means embodying another form of the invention;

FIGURE 7 is a front view of the meter means of FIGURE 7;

FIGURE 8 is a front view of meter means embodying another form of the invention; and FIGURE 9 is a perspective view with portions thereof broken away, of meter means embodying another form of the invention.

Referring to the drawings in more detail, and especially to FIGURES 1 and 2 thereof, the present invention is particularly adapted to be embodied in meter means 10 for indicating the values of a plurality of signals. Although the meter means may be made effective to measure any desired number of signals, in the present instance for purposes of illustration, the meter means 10 is disclosed as being effective to indicate the values of only two signals.

In this embodiment, a first meter 12 is provided which may include a housing 14 having a meter movement contained therein. This meter movement may be of a substantially standard variety for being electrically interconnected with the source of a first signal to be observed. More particularly, the movement may include an armature that is mounted on a shaft 16 so as to be disposed in a magnetic field. Whenever the signal circulates through a winding on the armature, a torque will be produced that will tend to rotate the armature and the shaft 16 supporting it about the axis of the shaft 16. A spring may be interconnected with the shaft 16 so as to apply an opposing torque whereby the shaft 16 will only rotate by an amount corresponding to the value of the signal.

In order to permit the observation of this rotation, an indicator such as an elongated needle or pointer 18 may be operatively interconnected with the end of the shaft 16 so as to rotate therewith about the axis of the shaft 16. This indicator or pointer 18 may extend along the face or front 20 of the housing 14. In addition, a scale means 22 may be provided on the front 20 so that an operator can accurately determine the position of the indicator 18. Although the scale means 22 may be of any suitable number, in the present instance, it includes a pair of arrays of indicia 21 and 23. Each of the arrays extends across the front 20 substantially concentrically with the shaft 16 as to register with a part of the indicator 18. The indicia in each array may be calibrated in units suitable for indicating the values of the signals supplied to the meter movement. By employing a plurality of arrays, one array may be calibrated in one set of units such as volts while another array may be calibrated in a second set of units such as amps, or, alternatively, the arrays may represent different sensitivities. It may thus be seen that an operator, by observing the front 20 of the housing 14, can determine which indicia the indicator 18 registers with, whereby the value of the signal will be known.

A second meter 26 may be provided which may include a housing 28 having a meter movement contained therein. This meter movement may be of a substantially standard variety and is preferably substantially identical to the first movement. This movement may be electrically interconnected with a source of a second signal so that the two sources and the two movements will be electrically totally independent of each other. The second meter movement includes an armature which is mounted on a shaft 30. When the second signal circulates through the armature, it will be effective to cause the shaft 30 to rotate by an amount proportional to the value of the signal.

The two meters 12 and 26 are preferably secured together by any suitable means so as to form an integral unit. For example, the two meters may be enclosed in a single housing or they may be secured together by a pair of mounting brackets 32 that extend along the sides of the housings 14 and 28. As will become apparent, it is preferable for the housings 14 and 28 to be secured such that the two shafts 16 and 30 are substantially aligned with each other and will rotate about a common axis 34.

In order to permit the observation of the rotation of the shaft 30, a second indicator 36 may be provided. This indicator 36 includes a first portion 38 that is secured to the shaft 30 so as to extend past the first meter 12 and a second portion 40 disposed adjacent to the front 20 of the meter 12. The second portion 40 includes a pointer 42 that is positioned to register with the scale means 22. Although the scale means 22 may include a separate array of indicia for the indicator 42, in the present instance, the indicator 42 registers with the two arrays 21 and 23. In the event there is a separate array or a separate set of arrays for each indicator 18 and 42, the indicators may have different colors such as black and red and the indicia may then have the same color as the indicator it is associated with.

It may thus be seen that if it is desired to employ the present embodiment for observing the values of two signals, the first meter 12 may be electrically connected to the source of the first signal and the second meter 26 may be electrically connected to the source of the second signal. Both of the meters 12 and 26 and the sources will be electrically isolated from each other so that there will be no interference with the sources and the signals and the positions of the pointers 18 and 42 can vary independently. The first signal will be effective to cause the shaft 16 to rotate about its axis and carry the pointer 18 across the scale means 22 so as to register with the indicia in the array 21 or 23 corresponding to the value of the first signal. The second signal will be effective to cause the shaft 30 to rotate about the same axis 34 and carry the second pointer 42 across the scale 22 so as to register with the indicia in the array corresponding to the value of the second signal. Since both of the pointers 18 and 42 will rotate independently of each other, they may register with the indicia in the same array or in different arrays. It should be noted that both of the indicators will be in the same field of vision for the operator and he may simultaneously observe both indicators. As a consequence, when making an observation, the operator may very quickly observe both of the indicators. Moreover, if one of the indicators moves while the other indicator is being observed, such a condition will be very readily apparent to the operator.

In the event the meter means 12 and 26 are interconnected with sources of two signals which are to be maintained in some predetermined proportions, the sensitivities of the meters may be arranged such that both of the pointers 18 and 42 move by the same amount so as to "track" with each other and will be aligned or superimposed on each other. Thus, by a quick glance at the front 20 of the meters, an operator can observe whether or not the two indicators 18 and 42 are superimposed on each other and the operator does not have to determine the exact values of the signals to see if they are equal. In addition, it should be noted that in the event a transient condition is occurring, the operator can simultaneously observe the movement of both pointers 18 and 42 and it can be determined whether or not the two signals maintain the desired relationship throughout the transient condition.

As an alternative, the embodiment of FIGURE 3 may be employed. In this embodiment, a first meter 50 and a second meter 52 are provided that may be basically the same as the meters 12 and 26 in the first embodiment. The first meter 50 may be interconnected with the source of the first signal and include an armature that is mounted on a shaft 54 so as to rotate the shaft 54 about its axis by an amount corresponding to the value of the first signal. The second meter 52 may be interconnected with the source of the second signal and includes an armature that is mounted on a shaft 56 so as to rotate the shaft 56 about its axis by an amount corresponding to the value of the second signal. The two meters 50 and 52 may be entirely enclosed within a single housing or they may be secured together by a pair of brackets 58 in substantially the same manner as in the first embodiment. If so desired, the two meters may be positioned so that the two shafts 54 and 56 are in line with each other and rotate about a common axis substantially as shown. An indicator 60 may be secured to the end of the shaft 54 so as to extend along the front of the meter 50. Thus, as the signal causes the armature to rotate the shaft 54, the indicator 60 will rotate about the axis of the shaft 54 and sweep across the face of the meter 50.

In order to indicate the position of the indicator 60 and the value of the signal, scale means 62 may be provided that includes one or more arrays of indicia positioned to register with at least a portion of the indicator 60. In the present instance, the scale means 62 is on a member 64 disposed in front of the indicator 60. At least the portion of the member 64 having the arrays of indicia thereon is transparent. Thus, the indicator 60 will be visible through this portion and will appear to register with a portion of the scale 62. To reduce parallax, the member 64 may be disposed close to the indicator 60 and a mirror 66 may be disposed on the front of the meter 50. If the operator is positioned so that the indicator 60 and its reflection from the mirror 66 are aligned with each other, the operator will be positioned such that the line of sight is normal to the scale 62 and parallax will be reduced.

The second meter 52 may be substantially identical to the first meter 50 in that it may be connected with the source of the second signal and includes an armature that is mounted on the shaft 56 so as to rotate the shaft about its axis by an amount corresponding to the value of the signal. The second meter 52 may be premanently secured to the first meter 50 by an outer housing or by brackets 58 so as to be disposed immediately behind the first meter 50 with the axes of the two shafts 54 and 56 in substantial alignment with each other.

An indicator 68 may be secured to the end of the shaft so as to register with the scale. In the present instance, this indicator 68 includes a frame with at least two arms 70 and 72 that extend around the meter at substantially diametrically opposed sides. A member 74 may extend between the ends of the arms 70 and 72 so as to be disposed immediately adjacent to the scale 62 on the member 64. An indicating portion of this member 74 registers with the indicia and is preferably a relatively narrow member such as a wire or ribbon. The indicating portion may be disposed immediately in front of the scale so as to register with the indicia thereon. Since the portion of the member 64 surrounding the indicia is transparent, the operator may observe the reflection of the indicator in the mirror 66. Thus, by moving so as to align the member 74 and its reflection in the mirror 66, the operator may reduce parallax in reading this indicator. It may thus be seen that the arms 70 and 72 and related structure may have a low moment of inertia but a sufficiently high rigidity to prevent vibrations thereof so as to produce an accurate reading.

As a further alternative, the embodiment of FIGURES 4 and 5 may be employed. In this embodiment, a first meter 80 is provided that may be interconnected with the source of a first signal. This meter may include a shaft 82 that will be effective to rotate about the axis thereof by an amount corresponding to the value of the signal applied thereto. An indicator 84 may be secured to the outer end of the shaft 82 so as to extend along the face 86 of the meter 80. The indicator 84 will thus swing about the axis of the shaft 82 and travel across the face 86 of the meter 80.

In order to indicate the position of the indicator 84 and the value of the signal, scale means 88 may be provided on the face 86 of the meter 80. This scale means 88 includes one or more arrays of indicia that are substantially concentric with the axis of rotation and may be calibrated to correspond to the values of the signal.

A second meter 90 may be provided that is substantially identical to the first meter. This meter 90 also includes an armature that is mounted on a shaft 92 so as to be effective to rotate the shaft 92 about the axis thereof by an amount proportional to the value of the signal.

An indicator 94 may be provided on the end of the shaft 92 so as to rotate with the shaft. This indicator preferably does not extend along the side of the meter 90, but projects in the opposite direction. As a result, the second meter may be inverted from the first meter secured thereto by a bracket 96 with the axis of the shaft 92 aligned with the axis of the first shaft 92. This will position the second indicator 94 so as to extend along the first face adjacent the first indicator 84. If the polarity of the movement in one of the meters is reversed, the two indicators 84 and 94 may be made to "track" with each other and register with the various indicia in one or more of the arrays on the face 86.

As a further alternative, the embodiment of FIGURES 6 and 7 may be employed. In this embodiment, a first meter 100 is provided that may be interconnected with the source of a first signal. This meter 100 may include a housing 115 having a meter movement disposed inside thereof. This meter 100 includes a shaft 102 which projects from the face 104 of the housing and is effective to rotate its axis by an amount corresponding to the value of the signal supplied to the meter movement. An indicator 105 may be secured to the outer end of the shaft 102 so as to extend along the face 104. The indicator 105 will thus swing about the axis of the shaft 102 and travel across the face 104 of the meter by an amount proportional to the amplitude of the signal supplied to the movement.

In order to indicate the position of the indicator 105 and the value of the signal, scale means 106 may be provided on the face 104 of the meter 100. This scale means 106 may include a first array 108 of indicia that are arranged substantially concentric with the axis of rotation of the shaft 102. These indicia may be calibrated in units corresponding to one set of signals. In addition, a second array 110 of indicia may be provided adjacent to the first array 108 substantially concentric with the first array 108. The indicia in the second array may be calibrated to correspond to a different set of signals. That is, the two arrays may represent different functions such as current flow or potential difference or they may represent different sensitivities of the same functions.

A second meter 112 may be provided that is substantially identical to the first meter 100. This meter 112 may also include a housing 114 having a meter movement disposed therein that may be interconnected with a source of a second signal. This movement includes a shaft 116 that projects from the front of the meter and is effective to rotate about its axis by an amount proportional to the value of the second signal. The second meter 112 may be secured to the first meter 100 by means of an outer housing or by means of a pair of brackets 119 substantially as shown. If desired, the meters may have their shafts 102 and 116 disposed in alignment with each other.

Indicator means 118 may be provided on the end of this shaft 116 so as to rotate therewith. This indicator means 118 preferably includes a portion 120 which extends around the first meter 100. An indicator or pointer 122 may project from the portion 120 to extend across a peripheral portion of the face 104. If the two shafts 102 and 116 are coaxial, the pointer 122 will rotate about the same axis as the first indicator 105. If desired, the end of the indicator or pointer 122 may be in a different plane than the indicator 105 so that they may overlap and register with the same scale means. However, in this embodiment, the two ends are disposed in the same plane so as to be adjacent to each other without overlapping. Thus, they will not produce confusion as to which indicia the indicators register with on the face 104.

In order to indicate the position of the second indicator and the value of the second signal, scale means 106 may include one or more additional arrays adjacent the periphery portion of the face. In the present instance, only one array 124 is shown that is substantially concentric with the first arrays. The indicia may be calibrated to correspond to the values of the second signals.

As an additonal alternative, the embodiment of FIGURE 8 may be employed. In this embodiment, a first meter 130 is provided which has a housing 132 enclosing a meter movement for interconnection with a source of a first signal. This movement will be effective to rotate the shaft 134 by an amount corresponding to the value of the signal applied thereto. An indicator 136 may be secured to the outer end of the shaft 134 so as to extend along the face 136a of the meter 130. The indicator 136 will thus swing about the axis of the shaft 134 and travel across the face 136a of the meter 130.

In order to indicate the position of the indicator 136 and the value of the signal, scale means 140 may be provided on the face 136a of the meter. In the present instance, this scale means 140 includes a pair of arrays 142 and 144 of indicia that are substantially concentric with the axis of rotation of the shaft 134 and are calibrated in units corresponding to the values of the signals to be supplied to the meter movement.

A second meter 146 may be provided that is substantially identical to the first meter 130. This meter 146 also includes a housing 148 which encloses a second meter movement effective to rotate a shaft 150 about its axis by an amount corresponding to the value of a second signal supplied to the second meter movement. The second meter housing 148 may be secured to the first meter housing 132 so that the shaft 150 will not be disposed in alignment with the first shaft 134. This shaft 134 will thus project past the housing 132. In order to indicate the position of the shaft 150, an indicator 152 may be secured to the end of the shaft 150 so as to extend along the face 136a of the meter 130 in front of the indicator 136. To facilitate observing the position of the indicator 152, the scale means 140 may include a separate pair of arrays 154 and 156 of indicia that are substantially concentric with the shaft 150.

It may thus be seen that in this embodiment, the arrays of indicia are not all substantially concentric with each other. As a result, although the indicators and the portions of the scale therefor may be colored to match, it has been found that because of their distinctive relative positions, the arrays corresponding to any given indicator are readily apparent.

As a further alternative, the embodiment 160 of FIGURE 9 may be employed. In this embodiment 160, a first meter 162 is provided that includes an enclosure 164 for containing a meter movement which may be interconnected with the source of a first signal. The movement may include an armature that is mounted on a shaft 166 so as to be effective to rotate the shaft 166 about its axis by an amount corresponding to the value of the signals supplied to the meter movement. An arm 168 may be secured to the outer end of the shaft 166 so as to extend along the side of the enclosure 164 so as to terminate adjacent the end wall 170. This end wall 170 is preferably arcuate and substantially concentric with the axis of the shaft 166. A pointer 172 may be provided on the outer end of the arm 168 so as to project across a portion of the end wall 170 substantially parallel to the axis of the shaft. The pointer 172 may thus swing about the axis of the shaft 166 and travel back and forth across the end wall 170.

In order to facilitate observing the position of the pointer 172 and scale means 176 may be provided on the end wall 170. In the present instance, this scale means includes a first pair of arrays 178 and 180 of indicia which may be calibrated in different units so as to correspond to the values of the signals that will be supplied to the movement.

A second meter movement 182 may be provided adjacent to the first meter 162. This meter may also include an enclosure 184 that may be secured to the first enclosure 164 by means of an outer housing 186. A meter movement may be disposed in the enclosure that has an armature mounted on a shaft 188 so as to be effective to rotate the shaft 188 about its axis by an amount proportional to the value of the signal supplied to the movement. An arm 190 may be provided on the end of the shaft 188 so as to extend along the side wall of the enclosure 184 and move with the shaft 188 in response to signals supplied to the movement. A pointer 194 may be secured to the end of the arm 190 so as to project along the end wall 170 substantially parallel to the axis of the shaft 188. As a consequence, the movement of the shaft will be effective to move the pointer 194 back and forth across the end wall 170 substantially the same as the pointer 172.

To facilitate observing the position of this pointer 194 and the value of the second signal, the scale means may include another pair of arrays 196 and 198 that extend across the end wall 170 substantially similar to the arrays 178 and 180.

Although only a limited number of embodiments of the present invention are disclosed and described, it will be readily apparent to those skilled in the art that numerous changes and modifications may be made thereto without departing from the spirit of the invention. By way of example, although only a pair of meter movements are shown in each embodiment, if desired, any number of meter movements and associated pointers may be provided. In addition, it should be noted that the meter means may be disposed in any desired configuration and the scale means may have any desired number of arrays of indicia arranged in any desired patterns. Accordingly, the foregoing disclosure and description are for illustrative purposes only and do not in any way limit the invention as defined by the claim.

What is claimed is:

1. A dual meter for simultaneously indicating the value of two separate signals, said meter comprising the combination of:

a transparent face having a plurality of calibrated scales extending thereacross, each of said scales including a plurality of indicia positioned to correspond to possible magnitudes of said signals, a first meter movement for being electrically interconnected with a source of the first of said signals and effective to assume an angular position proportional to the magnitude of the first signal, a first indicator disposed on one side of said transparent face and extending across said face to register with at least one indicia in each of the scales in said plurality, said first indicator being interconnected with the first movement and carried thereby through an arc proportional to the magnitude of the first signal to thereby align the first indicator with an indicia proportional to the first signal, a second meter movement positioned adjacent to the first meter movement for being electrically interconnected with a source of the second of the signals, said movement being effective to assume an angular position proportional to the magnitude of the second signal, and a second indicator interconnected with the second movement and disposed on one side of the transparent face opposite from the first indicator, said second meter movement carrying the second indicator through an arc proportional to the angular displacement of the second movement and the magnitude of the second signal, said second indicator overlapping the first indicator and registering with at least one indicia in each of said scales in said plurality.

References Cited
UNITED STATES PATENTS

| | | | |
|---|---|---|---|
| 1,960,241 | 5/1934 | Deerwester | 324—114 |
| 2,235,390 | 3/1941 | Smith | 324—114 |
| 2,323,733 | 7/1943 | Smith | 324—114 |
| 2,517,216 | 8/1950 | Lamb | 324—114 |
| 2,539,143 | 1/1951 | Knudsen | 324—114 |
| 3,010,067 | 10/1961 | Evans | 324—114 |

RUDOLPH V. ROLINEC, *Primary Examiner.*

FREDERICK M. STRADER, *Examiner.*

WALTER L. CARLSON, D. R. GREENE,
*Assistant Examiners.*